Oct. 19, 1971  R. L. ARCHER  3,613,464
APPARATUS FOR ORIENTING BEAM DIRECTING OR VIEWING APPARATUS
Filed Oct. 2, 1969  5 Sheets-Sheet 2

INVENTOR
ROBERT L. ARCHER

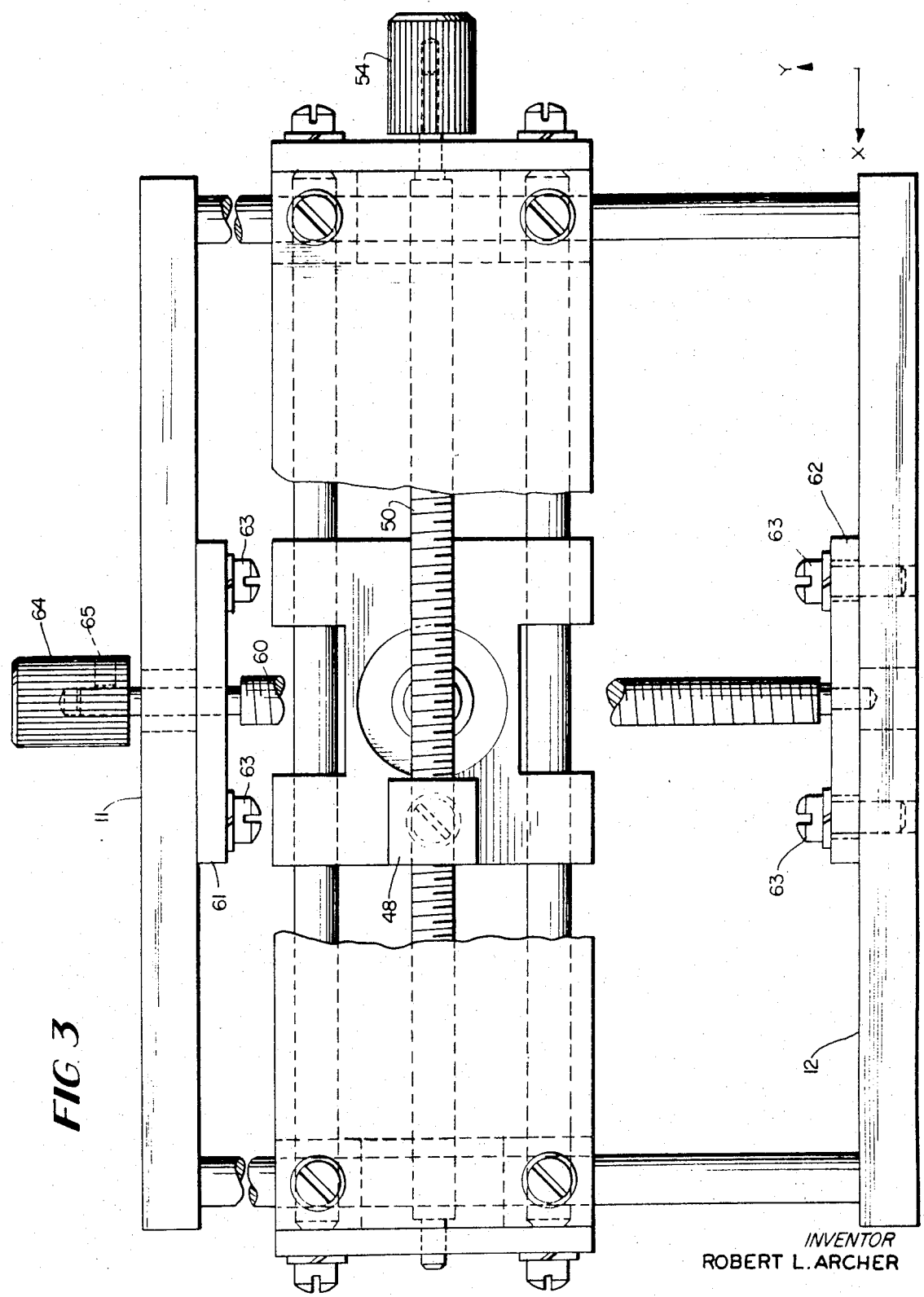

INVENTOR
ROBERT L. ARCHER

Oct. 19, 1971   R. L. ARCHER   3,613,464
APPARATUS FOR ORIENTING BEAM DIRECTING OR VIEWING APPARATUS
Filed Oct. 2, 1969

INVENTOR
ROBERT L. ARCHER

United States Patent Office 3,613,464
Patented Oct. 19, 1971

3,613,464
APPARATUS FOR ORIENTING BEAM DIRECTING OR VIEWING APPARATUS
Robert L. Archer, 17 Wren Drive, Woodbury, N.Y. 11797
Filed Oct. 2, 1969, Ser. No. 863,277
Int. Cl. F16c 1/00; F16h 27/02
U.S. Cl. 74—89.15                                11 Claims

ABSTRACT OF THE DISCLOSURE

Apparatus for orienting a beam directing or viewing device having means for rotatably mounting the sensitive element of the device at the geometrical center of a spherical bearing. One end of a linkage arm is directly or indirectly connected to the device and the other end is then coupled to a mechanism which limits its motion to translation along either of two mutually orthogonal reference axes. Translation along either one of the two reference axes will cause the sensitive element to be rotated about the corresponding orthogonal axis without cross-coupling therebetween.

BACKGROUND OF THE INVENTION

Field of use

This invention relates to apparatus for orienting an object and, while the invention is subject to wide range of applications, it relates particularly to apparatus for orienting an energy beam directing or viewing devices and will be particularly described in that connection.

Description of the prior art

Apparatus for orienting beam directing or viewing devices with reference to one or more axes are common in the prior art. In most cases multi-axis positional changes are accomplished by means of gimbal systems. For an illustrative example, we shall consider a situation where it is desired to orient a mirror for rotation about a set of orthogonal or X-Y coordinates. If the mirror is mounted in a gimbal system, it can be clearly seen that once the outer or independent gimbal is precessed through any angle, the axis of rotation of the inner or dependent gimbal will no longer coincide with its initial axis of rotation but will assume a new axis of rotation dependent upon the angle the outer gimbal has precessed. Therefore, the inner gimbal can no longer be rotated about the initial axis of rotation after the outer gimbal has been rotated. The new position of the mirror, after actual gimbal rotations, is not the same as if the original axes were rotated by the same angles. In fact, in order to generate spacial orientations of gimbals based on initial axes positions, it is necessary to use an Eulers servo system programmed to move in accordance with Eulers equations.

Movement of the independent gimbal changes the axis about which the dependent gimbal rotates. This dependence of the orientation of the axis of rotation of the inner gimbal upon the orientation of the outer gimbal is referred to herein as cross-coupling. The cross-coupling effect inherent in a gimbal system which is utilized to orient a device mounted upon the dependent gimbal with reference to a fixed set of orthogonal X-Y coordinates is a serious limitation of such systems. In order to efficiently and effectively overcome this limitation an expensive and often troublesome and unreliable servo system must be employed.

It is an object of this invention, therefore to provide a new and improved apparatus for orienting beam directing or viewing devices which obviates one or more of the above mentioned disadvantages of the prior art systems.

It is another object of this invention to provide a new and improved apparatus for orienting beam directing or viewing devices which substantially eliminates cross-coupling between mutually orthogonal reference axes.

It is another object of this invention to provide a new and simplified apparatus for orienting beam directing or viewing devices which substantially eliminates cross-coupling between mutually orthogonal reference axes.

It is still another object of this invention to provide a new and inexpensive apparatus for orienting beam directing or viewing devices which substantially eliminates cross-coupling between mutually orthogonal reference axes.

SUMMARY OF THE INVENTION

In accordance with the invention there is provided, for use in orienting beam directing or viewing devices having a sensitive element, an apparatus which comprises: a support; a spherical joint mounted upon the support having at least one fixed and one rotatable element; means for mounting the sensitive element upon the rotatable element of the spherical joint so that the center of rotation of the sensitive element is substantially concentric with the geometrical center of the spherical joint; a linkage member having one end affixed to the mounting means; and means for translating the free end of the linkage member so that the sensitive element is constrained to rotate about two mutually orthogonal reference axes; whereby the sensitive element may be rotated about either or both of the reference axes without cross-coupling therebetween.

The phrase "sensitive element" is used herein and in the appended claims to indicate that element of the beam directing or viewing device which controls the attitude of the energy beam which is to be oriented. For example: for a mirror it is its reflective surface; for cathode ray tube it is face plate or, in special cases it is its deflection yoke; for a laser it is its emitting surface; for a radar antenna, a search light or a sonic transducer it is their effective beam generating plane; etc.

For a better understanding of the present invention, together with further objects and features thereof, reference is had to the following description, to be read in conjunction with the accompanying drawings wherein like components in the several views are identified by the same reference numeral, while its scope will be pointed out in the appended claims.

BRIEF DESCRIPTION OF THE DRAWINGS

FIG. 3 is an end view, along the Z axis, of the embodiment of the invention illustrated in FIG. 1.

DESCRIPTION OF THE PREFERRED EMBODIMENT

Figure 1:
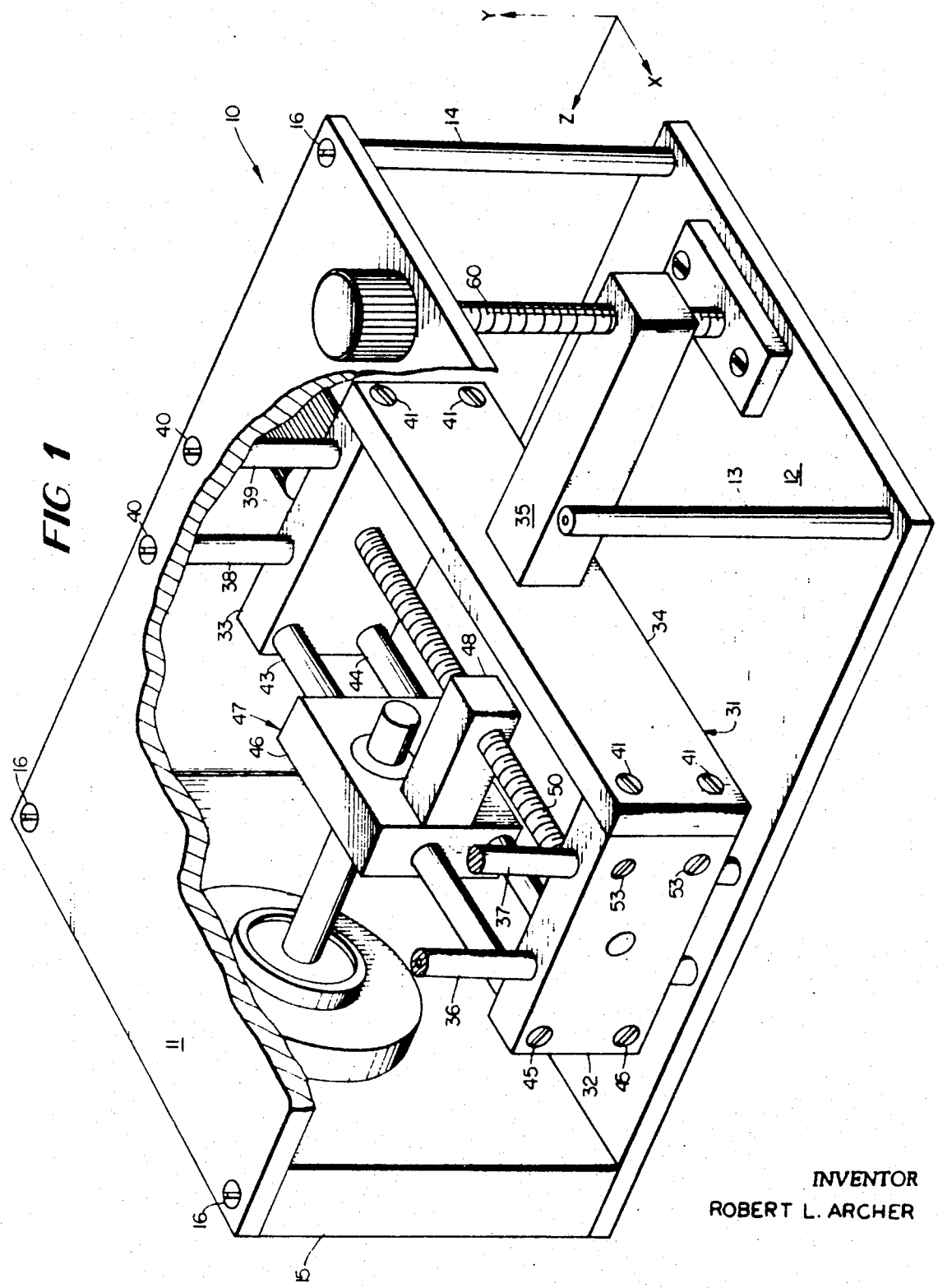
FIG. 1 is a perspective representation, partially in section, of an illustrative embodiment of the invention.

Referring now to FIG. 1, a perspective representation, partially in section, of an illustrative embodiment of applicant's invention. Support 10, which comprises cap plate 11 and base plate 12, arranged in spaced apart parallel planes, is the basic element upon which the remaining components of the overall structure depend. Plates 11 and 12 are spaced apart by means of posts 13 and 14 and main bearing block 15, additional elements of support 10. Plates 11 and 12, posts 13 and 14 and main bearing block 15 are secured together by means of screws 16.

For purposes of this description we will assume that the beam directing or viewing device to be oriented is a mirror and its sensitive element is its reflective surface.

Figure 2:
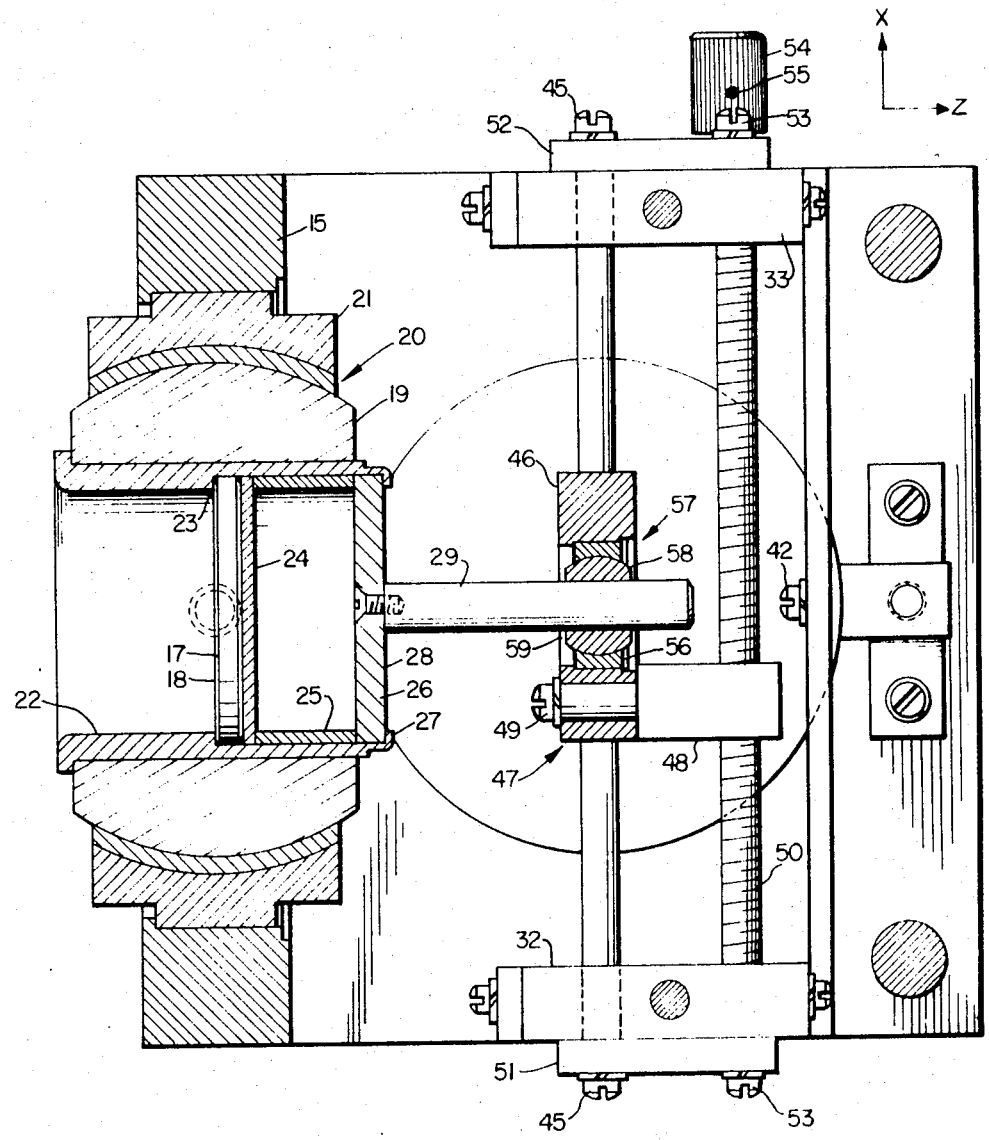
FIG. 2 is a cross-sectional representation of the embodiment of the invention illustrated in FIG. 1 taken through line 2—2.

Referring now to FIG. 2, mirror 17, having reflective surface 18, is disposed within rotatable element 19 of a spherical joint, which joint in the illustrative embodiment is spherical bearing 20. The fixed element 21 of bearing 20 is secured in place by means of its tight fit within main bearing block 15. The sensitive element, reflective surface 18 of mirror 17, is mounted so that its center of rotation is substantially concentric with the geometrical center of spherical bearing 20. The means illustrated to accomplish this mounting includes a bearing sleeve 22 which is pressed into rotatable element 19 of bearing 20. The inside diameter of sleeve 22 is enlarged to form a stop 23 which, when contacted by the surface of mirror 17, will align reflective surface 18 with the center of bearing 20. Mirror 17 is held in position by means of spacer shim 24, tubular spacer 25, end cap 26 and tang 27. Tang 27 is formed by reducing the thickness of sleeve 22 in the area protruding from rotatable element 19 and rolling this protrusion into contact with the exterior surface 28 of end cap 26.

A linkage member in the form of a linkage rod 29 is affixed to end cap 36 by means of flat-head screw 30. A flat-head screw is preferred because it provides automatic centering of rod 29. Of course, rod 29 is affixed to end cap 26 by means of screw 30 before tang 27 is rolled into contact with end cap 26.

It is not necessary that linkage rod 29 be in alignment with the center of mirror 17 or orthogonal thereto in order to practice applicant's invention, however, such an arrangement provides for a maximum angular displacement of mirror 17 in every direction. In special applications where it is not desired, possible or practical to connect linkage rod 29, as shown, it may be affixed to the means for mounting the sensing element at any desired location or at any desired angle.

Referring again to FIG. 1, the means illustrated for translating the free end of linkage rod 29 so that mirror 17 is constrained to rotate about two mutually orthogonal reference axes, designated as X and Y axes, includes a carriage assembly designated, in general, by the numeral 31. Carriage assembly 31 comprises sliding blocks 32 and 33, connecting strut 34 and Y adjustment arm 35. Posts 36–39 are all disposed substantially parallel to the Y reference axis and secured to plates 11 and 12 by means of screws 40. Blocks 32 and 33 which have parallel holes therethrough of a slightly larger diameter than posts 36–39, are slidably mounted upon posts 36–39. Strut 34, which connects blocks 32 and 33 is affixed thereto by means of screws 41. Arm 35 is connected to strut 34 by means of screw 42 (see FIG. 2).

Referring again to FIG. 1, a portion of the remainder of the means for translating linkage rod 29 will be discussed. Stabilization rods 43 and 44, disposed parallel to the X reference axis, are secured to sliding blocks 32 and 33 by means of screws 45. Bearing mounting block 46, a portion of swivel joint assembly 47, has two parallel apertures which slidably engage rods 43 and 44. Referring now to FIG. 2, X adjustment arm 48 is affixed to bearing mounting block 46 by means of screw 49. A threaded rod 50 is rotatably disposed between sliding blocks 32 and 33 parallel to the X reference axis. Threaded rod 50 is journaled between journal plates 51 and 52 which plates are affixed to blocks 32 and 33, respectively, by means of screws 45 and 53. A knob 54 is connected to one end of threaded rod 50 by means of set screw 55. Threaded rod 50 is passed, in threaded engagement, through a threaded hole in X adjustment arm 48. The fixed element 56 of spherical bearing 57 is secured in place by means of its tight fit within aperture 58 of mounting block 46. The movable element 59 of spherical bearing 57 slidably engages linkage rod 29.

Referring now to FIG. 3, an end view along the Z axis of the illustrative embodiment of FIG. 1, a threaded rod 60 is rotatably disposed between plates 11 and 12 parallel to the Y reference axis. Threaded rod 60 is journaled between journal plates 61 and 62 which plates are affixed to cap and base plates 11 and 12, respectively, by means of screws 63. A knob 64 is connected to one end of threaded rod 60 by means of set screw 65. Referring again to FIG. 1, threaded rod 60 is passed, in threaded engagement, through a threaded aperture in Y adjustment arm 35.

It is believed that the operation of the apparatus of the present invention is clear from the foregoing description. Briefly, mirror 17 is mounted within spherical bearing 20 by means of sleeve 22, shim 24, tubular spacer 25 and end cap 26 such that its center of rotation is substantially concentric with the center of rotation of bearing 20. Linkage rod 29, which is affixed to end cap 26, controls all X and Y axes motion of mirror 17. For example, if rod 29 is translated along the X axis, mirror 17 will rotate about the yaw or Y axis. If rod 29 is translated along the Y axis, mirror 17 will rotate about the pitch or X axis. Therefore, the means employed to control the translation of the free end of linkage rod 29 also controls the rotation of mirror 17.

The means employed to control the translation of the free end of linkage rod 20 along the X axis comprises carriage asembly 31, which includes sliding blocks 32 and 33, connecting strut 34 and Y adjustment arm 35, all affixed together, as shown, and slidably mounted upon posts 36–39. Spherical bearing 57, which together with bearing block 46 and X adjustment arm 48 comprise swivel joint assembly 47, slidably engages the free end of linkage rod 29. Swivel joint assembly 47 is slidably mounted upon stabilization rods 43 and 44 mounted parallel to the X axis and affixed to sliding blocks 32 and 33 of carriage assembly 31. Threaded rod 50 is rotatably mounted on carriage assembly 31 and is in threaded engagement with X adjustment arm 48. A knob 54 is secured to one end of threaded rod 50. Rotation of threaded rod 50 will cause swivel joint assembly 47 and linkage rod 29 to translate in the X direction. Of course, as swivel joint assembly 47 translates the end of linkage rod 29 will slide within spherical bearing 57 and mirror 17 will rotate about the yaw axis.

Translation of the free end of linkage rod 29 along the Y axis is accomplished by means of threaded rod 60, rotatably mounted on support 10, which is in threaded engagement with Y adjustment arm 35. A knob 64 is secured to one end of threaded rod 60. Rotation of threaded rod 60 causes carriage assembly 31, swivel joint assembly 47 and linkage rod 29 to translate along the Y reference axis. Again, linkage rod 29 will slide within spherical bearing 57 and mirror 17 will rotate about the pitch axis.

Figure 4:
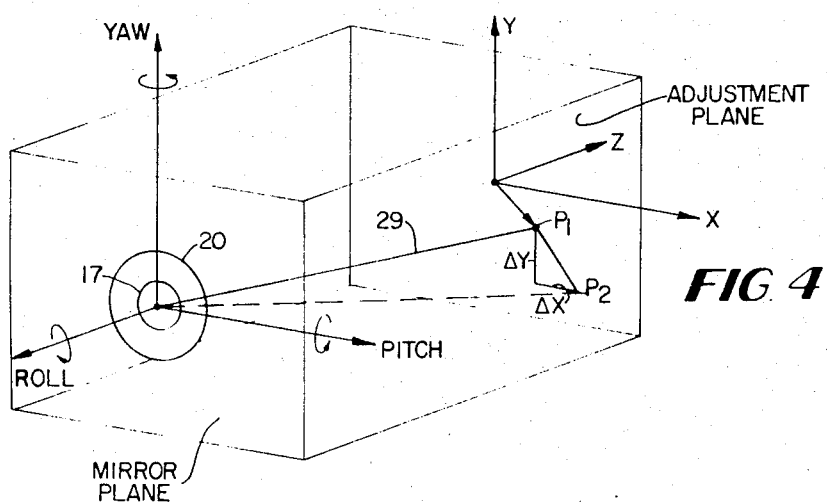
FIG. 4 is a kinematic diagram of the present invention.

Referring to FIG. 4, it can be easily seen that applicant's invention eliminates the cross-coupling problem inherent in prior art devices of this nature. Linkage rod 29 is moved from $P_1$ to $P_2$ by means of positional adjustments $\Delta X$ and $\Delta Y$, accomplished by translating the free end of linkage rod 29 a small distance along the X and Y reference axes. Rotation of the sphere, corresponding to spherical bearing 20, in the mirror plane causes mirror 17 to be rotated about the yaw axis in response to the $\Delta X$ adjustment and about the pitch axis in response to the $\Delta Y$ adjustment. However, the X and Y axes are fixed in space perpendicular to the Z axis. Therefore, the yaw and pitch axes must remain fixed in space since the X axis, the yaw axis and the Z axis are mutually perpendicular and the Y axis, the pitch axis and the Z axis are mutually perpendicular. The only logical conclusion being that the yaw and pitch axes are invariant.

Figure 5:
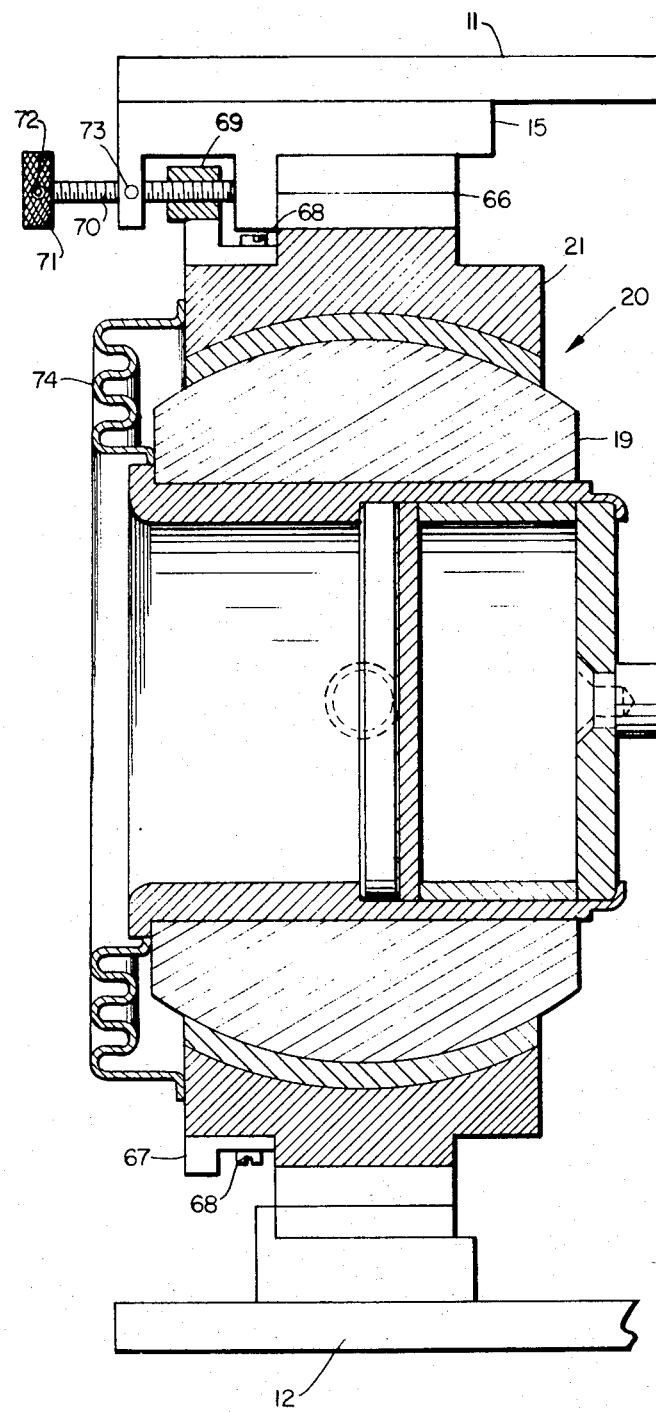
FIG. 5 is a representation, partially in section, of means for rotating the mirror about the yaw reference axis.

The apparatus of the present invention further comprises means for rotating mirror 17 about a third mutually orthogonal roll or Z axis. Referring now to FIG. 5, fixed element 21 of spherical bearing 20 is supported, within main bearing block 15, by means of bearing 66. Bearing 20 is secured within bearing 66 and bearing 66 is secured within main bearing block 15 by virtue of the tight fits between their mating surfaces. A ring gear 67 is also affixed to fixed element 21 of bearing 20 by any conventional means such as screws 68. A spur gear 69 is affixed to a shaft 70 which is rotatably mounted upon main bearing block 15. A knob 71 is affixed to shaft 69 by set screw 72. Rotation of spur gear 69 will cause spherical bearing 20, and all the apparatus dependent thereon, to rotate about the Z axis. A setscrew 73 may be used to lock shaft 70 and thereby prevent spur gear 69 from turning during periods of non-use. Spur gear 69 may be of the well known anti-backlash type if it is desired to eliminate substantially all the backlash in the mesh between spur gear 69 and ring gear 67.

Referring again to FIG. 5, one end of convoluted diaphragm 74 is secured to fixed element 21 and the other end is affixed to rotatable element 19 of spherical bearing 20 by any conventional means. Diaphragm 74, although permitting rotation of rotatable element 26 about the X and Y axes, prohibits relative rotation between fixed element 21 and rotatable element 19 of bearing 20 about the Z or roll axis.

Figure 6:
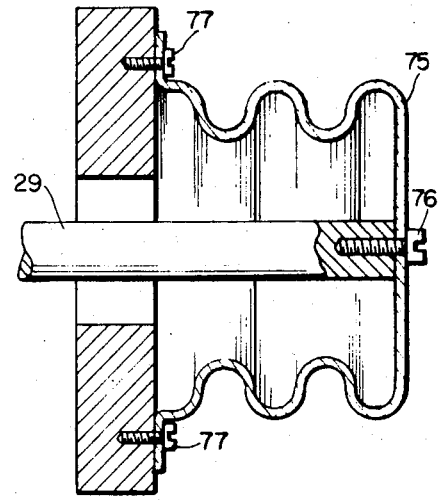
FIG. 6 is a cross-sectional representation of means for preventing rotation of the mirror about the yaw axis.

Referring now to FIG. 6, bellows 75 may be utilized to perform a similar function to that performed by convoluted diaphragm 74. One end of bellows 75 is affixed to the end of linkage rod 29 by means of screw 76. The other end of bellows 75 is affixed to mounting block 46 by means of screws 77. This arrangement permits rotation of mirror 17 about both the X and Y axes but prevents rotation about the roll or Z axis. It is to be noted that utilization of bellows 75 permits bearing 57 to be dispensed with, as shown, in applications where the stability afforded by such bearing is not required.

It is also appropriate at this time to point out that the apparatus discussed above in connection with providing roll adjustment for the present invention may also be incorporated between bearing sleeve 22 and rotatable element 19. This will allow mirror 17 to be rotated about its own variable roll axis, which axis is parallel to the attitude of the energy beam; not the independent or Z axis designated in FIG. 1.

Figure 7:
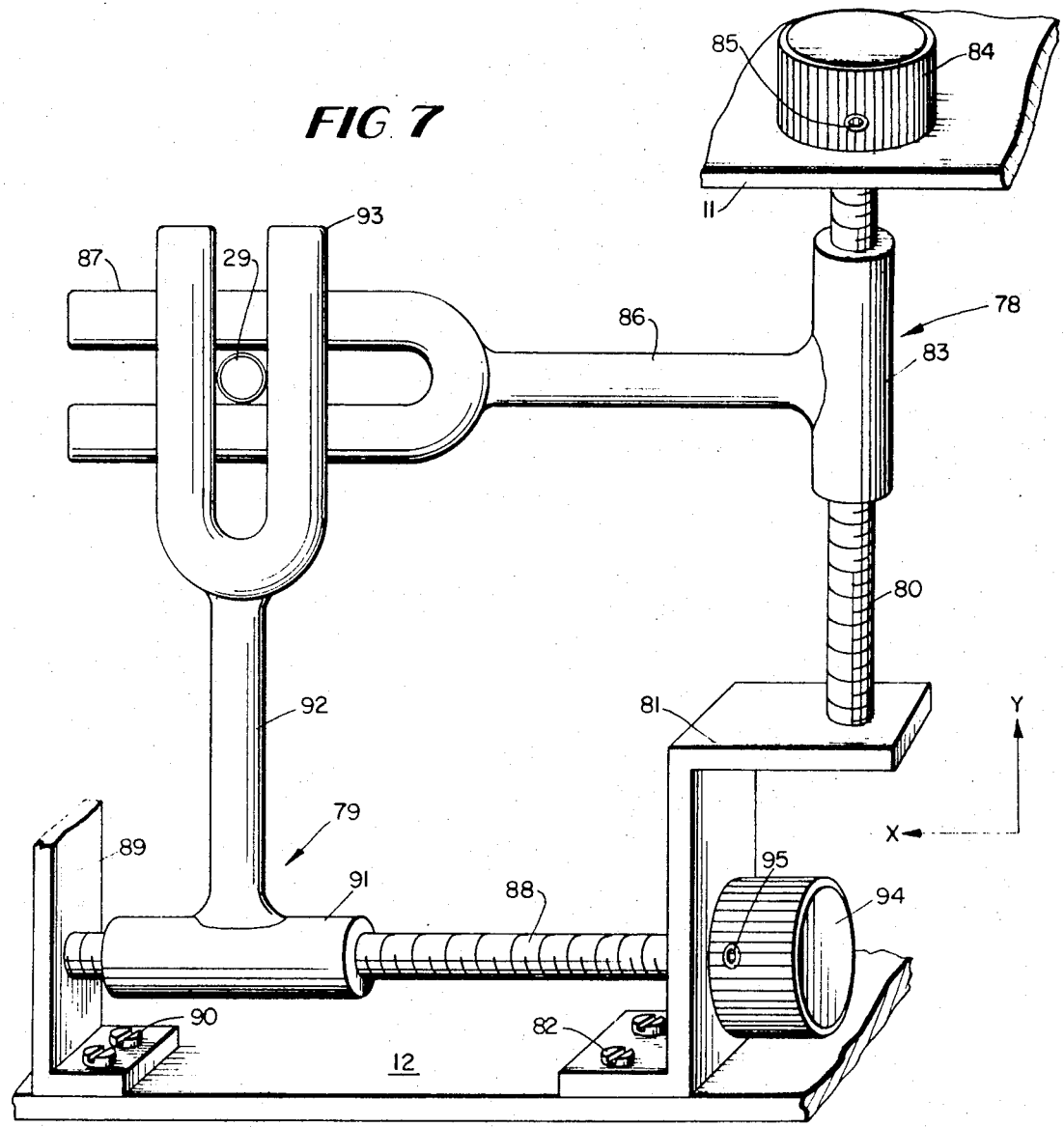
FIG. 7 is a perspective representation of an alternative means for translating the free end of the linkage member in which neither the X nor Y adjustment knobs translate.

Referring now to FIG. 7, this alternative embodiment is essentially comprised of two identical mechanisms designated, in general, by numerals 78 and 79.

Mechanism 78 comprises threaded rod 80 disposed substantially parallel to the Y reference axis. Threaded rod 80 is rotatably mounted between cap plate 11 and bracket 81 which is affixed to base plate 12 by means of screws 82. A threaded member, in the form of elongated internally threaded nut 83, is in threaded engagement with threaded rod 80. A knob 84 is affixed to one end of threaded rod 80 by means of setscrew 85. An arm 86 having an elongated forked end 87 is affixed to threaded nut 83 by any conventional means. The tines of fork 87 are substantially parallel to the X reference axis and spaced apart by a distance slightly greater than the diameter of linkage rod 29; the exact spacing being dictated by the accuracy required. Rotation of knob 84 causes arm 86 and linkage member 29 to translate along the Y reference axis.

Mechanism 79 is identical to mechanism 78 except that it is displaced by 90°. Threaded rod 88 is rotatably mounted between brackets 81 and 89. Bracket 89 is affixed to base plate 12 by means of screws 90. An elongated threaded nut 91 is in threaded engagement with threaded rod 88. An arm 92 having an elongated forked end 93 is affixed to nut 91 by any conventional means. The tines of fork 93 are substantially parallel to the Y reference axis and spaced apart by a distance slightly greater than the diameter of linkage rod 29. A knob 94 is affixed to shaft 88 by means of set screw 95. Rotation of knob 95 causes arm 92 and linkage rod 29 to translate along the X reference axis.

Thus, it is seen that the apparatus of the present invention, as discussed above, has a number of advantageous characteristics not found in prior art devices. In particular, it is pointed out that the present invention solves the problem of cross-coupling between orthogonal reference axes, which cross-coupling is inherent in prior art devices utilized to orient an object in a multi-axes system.

While what has been shown and described is believed to be the best mode and preferred embodiment of this invention, modifications and variations can be made therein, as will be clear to those skilled in the art, without departing from the spirit of the invention.

What is claimed is:

1. For use in orienting a beam directing or viewing device having a sensitive element, an apparatus which comprises:
   a support;
   a spherical joint mounted upon said support having at least one fixed and one rotatable element;
   means for mounting the sensitive element upon the rotatable element of said spherical joint so that the center of rotation of the sensitive element is substantially concentric with the geometrical center of said spherical joint;
   a linkage member having one end affixed to said mounting means; and
   means for translating the free end of said linkage member so that the sensitive element is constrained to rotate about two mutually orthogonal reference axes:
   whereby the sensitive element may be rotated about about either or both reference axes without cross-coupling therebetween.

2. The apparatus recited in claim 1 which further comprises means for rotating the sensitive element about a third reference axis.

3. The apparatus recited in claim 1 which further comprises means for rotating the fixed element of said spherical joint about a third mutually orthogonal reference axis.

4. The apparatus recited in claim 1 which further comprises means for rotating the rotatable element of said spherical joint about a third axis orthogonal to a plane defined by the reference axes and passing through the geometrical center of said spherical joint.

5. The apparatus recited in claim 1 further comprising means for preventing relative rotation, about a third mutually orthogonal reference axis, between the fixed and rotatable elements of said spherical joint.

6. The apparatus recited in claim 1 wherein said means for translating the free end of said linkage member comprises:
   a carriage assembly slidably mounted upon said support for translation in a direction parallel to the first reference axis, said carriage assembly having therethrough a first threaded aperture;
   a swivel joint assembly in slidable engagement with said linkage member having therethrough a second aperture;
   a first threaded rod rotatably mounted upon said support parallel to said first reference axes and passing in threaded engagement through the first threaded aperture; and
   a second threaded rod rotatably mounted upon said carriage member parallel to said second reference axis and passing in threaded engagement through the second threaded aperture.

7. The apparatus recited in claim 6 wherein said swivel joint assembly comprises:
   a bearing mounting block having a threaded aperture therethrough; and
   a spherical bearing slidably engaging said linkage member and affixed to said bearing mounting block.

8. The apparatus recited in claim 7 wherein said swivel joint assembly further comprises a bellows having one end affixed to said bearing mounting block and its other end affixed to said linkage member whereby said linkage member is constained from rotating about a third mutually orthogonal reference axis.

9. The apparatus recited in claim 6 wherein said swivel joint assembly comprises:
   a mounting member having a threaded aperture therethrough; and
   a bellows having one end affixed to said mounting member and its other end affixed to said linkage member; whereby said linkage member is constrained from rotating about a third mutually orthogonal reference axis.

10. The apparatus as recited in claim 1 wherein said means for translating the free end of said linkage member comprises:
   at least two fixed posts mounted upon said support in a plane orthogonal to the first reference axis;
   a carriage assembly slidably mounted upon said posts having therethrough a first threaded aperture;
   a bearing mounting member having therethrough a second threaded aperture;
   a spherical bearing slidably engaging the free end of said linkage member and supported by said bearing mounting member;
   a first threaded rod rotatably mounted upon said support parallel to the first reference axis and passing in threaded engagement through the first threaded aperture;
   a second threaded rod rotatably mounted upon said carriage assembly parallel to the second reference axis and passing in threaded engagement through the second threaded aperture.

11. The apparatus recited in claim 1 wherein said means for translating the free end of said linkage member comprises:
   a threaded rod rotatably mounted upon said support having its axis of rotation substantially parallel to the reference axis to be traversed;
   a threaded member rotatably supported by an in threaded engagement with said threaded rod; and
   an arm affixed to said threaded member having an elongated substantially orthogonal to said threaded rod through which is passed the free end of said linkage member.

References Cited
UNITED STATES PATENTS

| | | | |
|---|---|---|---|
| 3,036,281 | 5/1962 | Hilliard | 74—89.15 |
| 3,402,613 | 9/1968 | Neusel et al. | 74—89.15 |
| 2,906,292 | 9/1959 | Mayo | 74—501 |
| 2,919,599 | 1/1960 | Milton et al. | 74—501 |
| 3,229,082 | 1/1966 | Barron | 74—501 |
| 3,515,464 | 6/1970 | Peifer et al. | 350—286 |

WILLIAM F. O'DEA, Primary Examiner

W. S. RATLIFF, JR., Assistant Examiner

U.S. Cl. X.R.

74—501 M; 350—285